United States Patent [19]
Krebser et al.

[11] Patent Number: 4,768,944
[45] Date of Patent: Sep. 6, 1988

[54] PLASTIC INJECTION MOLDING MACHINE

[75] Inventors: Rudolf Krebser, Schübelbach; Jakob Kamm, Mollis, both of Switzerland

[73] Assignee: Netstal-Maschinen AG, Switzerland

[21] Appl. No.: 24,362

[22] Filed: Mar. 9, 1987

[30] Foreign Application Priority Data

Mar. 14, 1986 [CH] Switzerland ............ 1061/86

[51] Int. Cl.$^4$ ............................................. B29C 35/00
[52] U.S. Cl. ..................................... 425/569; 425/574; 403/322; 403/324; 403/31
[58] Field of Search ............... 425/542, 574, 589, 592, 425/593, 567, 569; 164/339, 342, 343; 403/322, 324, 31

[56] References Cited

U.S. PATENT DOCUMENTS

| 4,309,164 | 1/1982 | Egger et al. ............ 425/589 |
| 4,540,359 | 9/1985 | Yamazaki ................ 425/542 |

FOREIGN PATENT DOCUMENTS

| 2504719 | 8/1976 | Fed. Rep. of Germany ...... 425/574 |
| 2159568 | 6/1973 | France ........................ 425/574 |
| 82309 | 5/1985 | Japan ......................... 164/343 |
| 1008218 | 10/1965 | United Kingdom ........ 403/31 |
| 619702 | 8/1978 | U.S.S.R. ..................... 403/31 |

*Primary Examiner*—Bernard Nozick
*Attorney, Agent, or Firm*—McGlew and Tuttle

[57] ABSTRACT

A plasticizing and injection group of mechanisms is detachably secured on the injection side tool holder through a press-on and shift assembly. Releasable attachment occurs by automatically engageable and disengageable couplings each having a head, arranged at the end of an axially movable connecting element, e.g. of a piston rod of a press-on and shifting device. Slides engage the piston rod from behind a protuberance thereof slide back and forth crosswise to the connecting element. The slides are controlled by a central control unit of the machine. To perform maintenance work, the coupling is disengaged, and for better accessibility of the injection nozzle, the plasticizing and injecting group is moved away from the tool holder and can be pivoted out of the injection axis. Any manual work for releasing the attachment of the connecting element on the tool holder is eliminated.

7 Claims, 3 Drawing Sheets

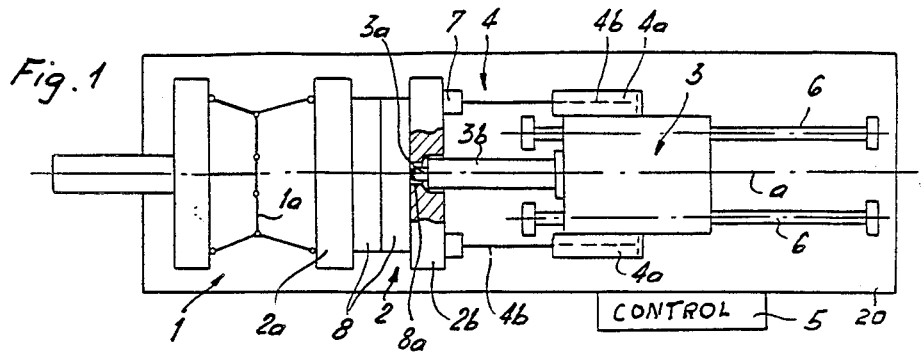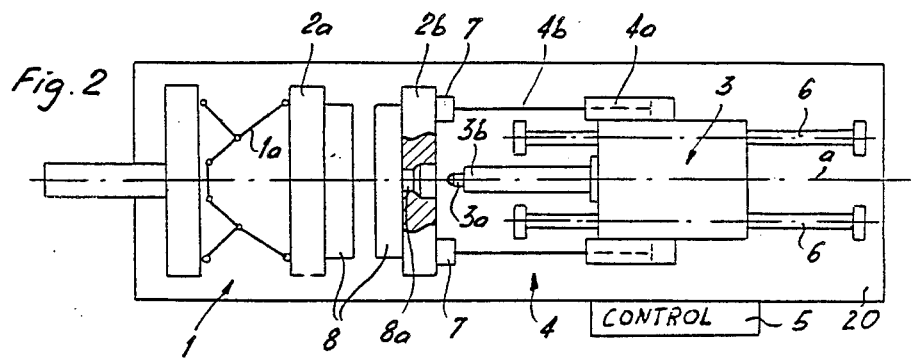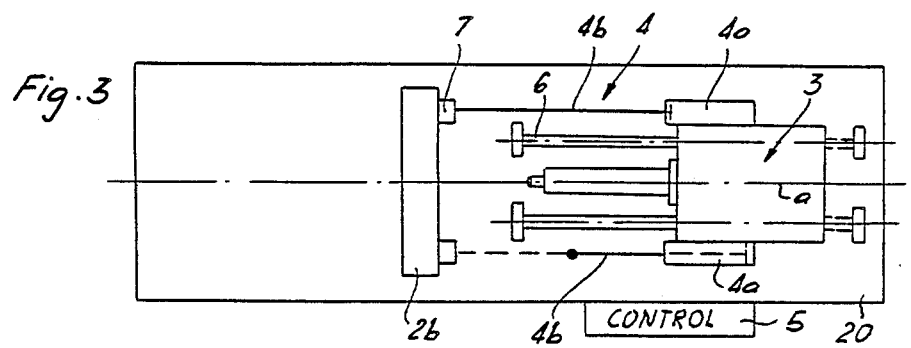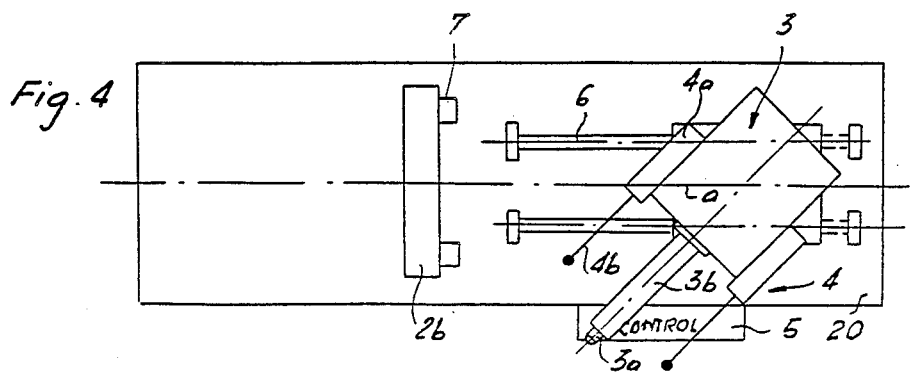

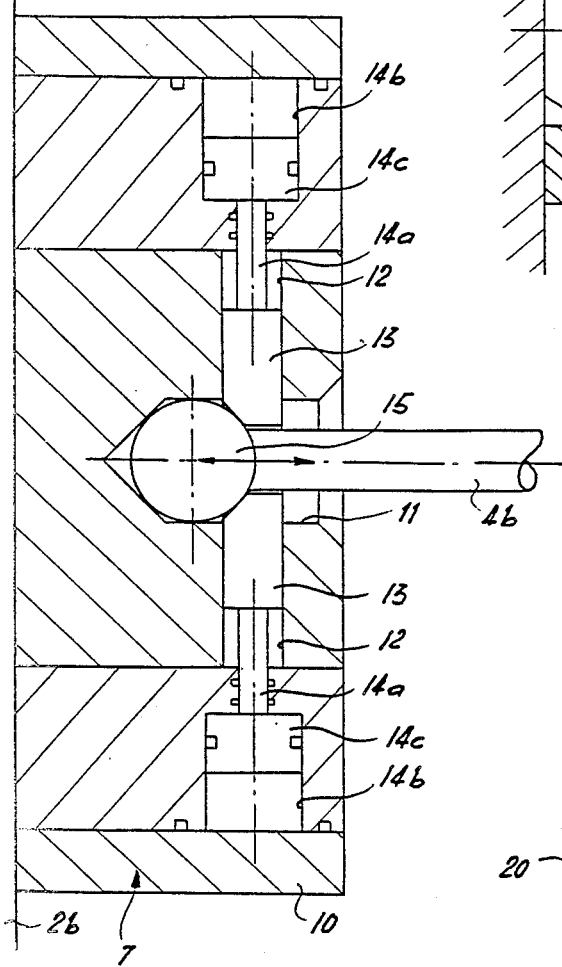
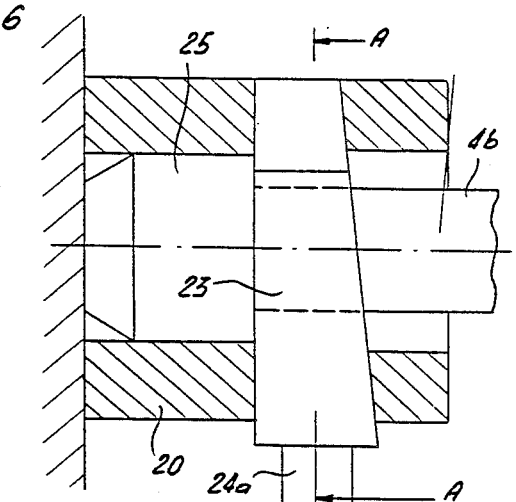
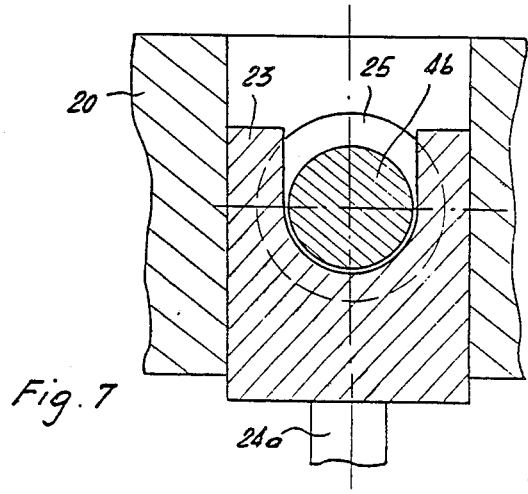

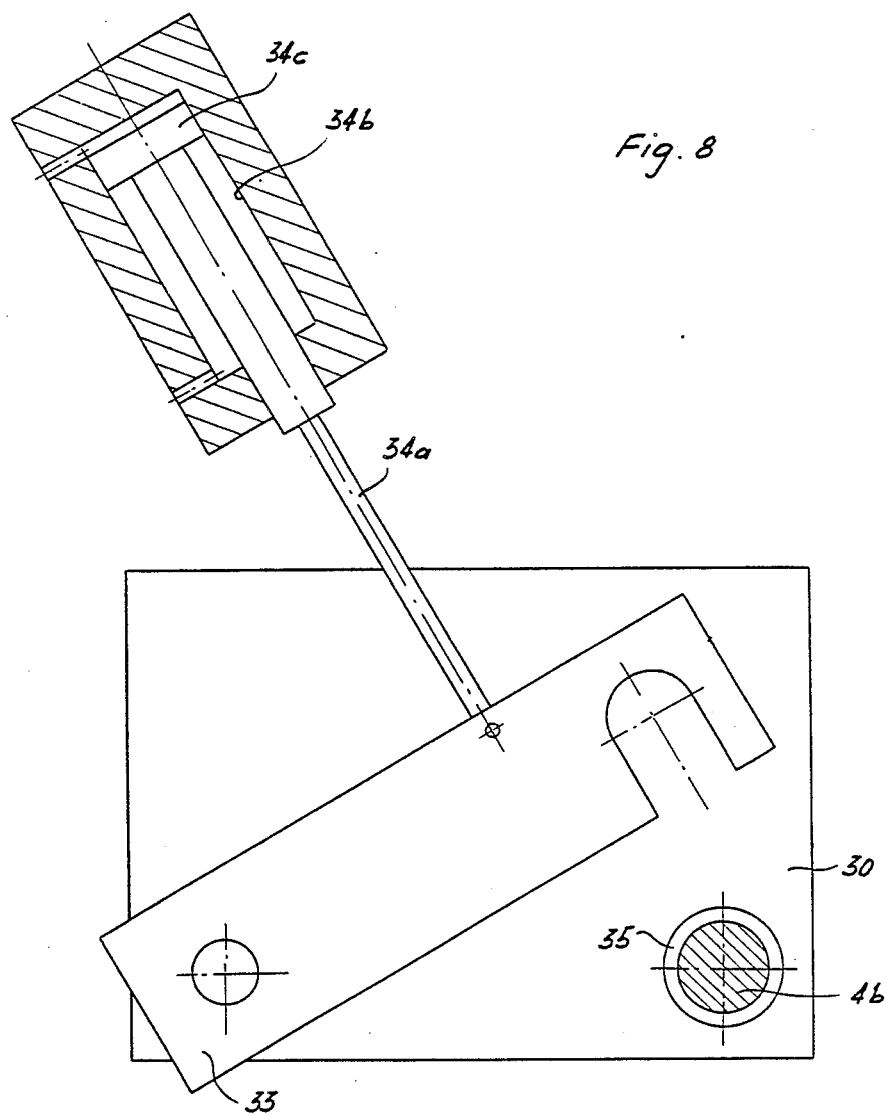

PLASTIC INJECTION MOLDING MACHINE

FIELD AND BACKGROUND OF THE INVENTION

This invention relates in general to injection molding machines and in particular to a new and useful injection molding machine in which a plasticizer and injector assembly may be positioned for engagement and disengagement from a fixed mold and tool holder part.

The subject of the invention is a plastic injection molding machine with plasticizing and injection group or assembly secured by a press-on and shift means on a fixed injection side tool holder for axial displacement relative thereto.

In plastic injection molding machines, nowadays, the injection group with an injection nozzle of the plasticizing unit is normally pressed with great force onto the sprue bush of the tool in the injection side tool holder usually by a hydraulic press-on device during the injection and after pressing phase, to prevent outflow of liquid plastic between the die and the sprue bush during these phases. In the following dosing phase, the injection group with the plasticizing unit is then separated from the sprue bush by a lift-off stroke of the press-on device, to prevent flow of heat between plasticizing unit and tool.

To ensure good accessibility of the nozzle of the plasticizing unit during maintenance work, the injection group with the plasticizing unit can be retracted into a rear position, and often the injection group and plasticizing unit can even be pivoted out. But to be able to swing out the plasticizing and injection group, the solid connection between press-on and shift means and injection side tool holder or plasticizing and injection group must be undone. The attachment, necessary for axial displacement of the group or for producing the press-on pressure, the attachment, e.g. of the piston rod of the usually provided hydraulic press-on and shift means to the injection side tool holder or to the plasticizing and injection group, is normally effected by means of screws. Since relative to the injection axis of the machine the press-on and shift means must always have at least two press-on and shift means arranged symmetrically to this axis, undoing the attachment always presupposes the unscrewing of a number of screws, which means time ocnsuming and complex manual work.

SUMMARY OF THE INVENTION

The present invention avoids the disadvantages of the known injection molding machines and it includes press-on and shift means provided between an attachment point at the injection side tool holder and an attachment point at the plasticizing and injection group is connected with one of these attachment points by an automatically engaging and disengaging coupling device. If, as usual, the press-on and shift means comprises several piston devices, e.g. hydraulic ones, or electric spindle devices arranged symmetrically to the injection axis, a coupling is, of course, assigned to each of these devices, all couplings being adapted to engage or disengage simultaneously.

Expediently the arrangement is organized so that the element or elements of the press-on and shift means are displaceable parallel to the injection axis, that is, e.g. a piston rod or a spindle, are connected with the injection side tool holder via the coupling device, while a fixed element of the press-on and shift means, that is, e.g. a cylinder or an electric motor with transmission, is firmly connected with the plasticizing and injection group. The coupling device is appropriately controlled by the central control of the machine. By avoiding complicated and time-consuming manual work for undoing the connection between the press-on and shift means and the plasticizing and injection group or the injection side tool holder, the time needed for maintenance work can be reduced considerably.

Accordingly, it is an object of the invention to provide a plastic injection molding machine which includes an assembly of various elements mounted on a support which permits a plasticizer and injector to be selectively engaged and disengaged with an injection molding part and tool holder and which advantageously also provides means for shifting the plasticizer and injector out of alignment with the tool holder for maintenance purposes.

A further object of the invention is to provide a plastic injection molding machine which is simple in design, rugged in construction and economical to manufacture.

The various features of novelty which characterize the invention are pointed out with particularlity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a top view of a plastic injection molding machine constructed according to the invention, whose elements occupy the position corresponding to the injection and after press phase;

FIG. 2 is a top view similar to FIG. 1 with the machine elements in a position corresponding to the dosing phase;

FIG. 3 is a top view similar to FIG. 1 with the plasticizing and injection group moved into the rear end position;

FIG. 4 is a top view similar to FIG. 3 with plasticizing and injection group separated from the injection side tool holder and pivoted into position for maintenance work;

FIG. 5 is an axial sectional view on a larger scale of a first embodiment of a coupling;

FIG. 6 is an axial section of a second embodiment of a clutch;

FIG. 7 is a transverse section along ine A—A in FIG. 6; and

FIG. 8 is a transverse section similar to FIG. 7 of a third embodiment of a coupling.

DESCRIPTION OF THE PREFERRED EMBODIMENTS

Referring to the drawings in particular the invention embodied therein comprises a plastic injection molding machine which includes a fixed support 20 on which a fixed mold part or tool holder 2b is positioned at a fixed location. In accordance with the invention, a mold closing and biasing assembly or mold closing and closing force generating unit 1 is mounted on the support 20 and it includes a movable mold part 2a movable toward and away from the fixed mold part 2b. The plasticizer and injector assembly 3 is mounted on the support 20 for movement toward and away from the fixed mold part 2b on the side thereof opposite to the mold closing and biasing assembly 1. In accordance with the invention, the plasticizer and injector assembly may be shifted along tracks or spars 6 so as to position an injector die 3a in a sprue bush 8a of a tool 8 which is part of the mold closing and biasing assembly 1. A feature of the construction resides in the fact that piston rod members 4a and 4b which have pistons which are movable in cylinders 4a which are carried by the plasticizer and injector assemblly 3 and may be rapidly shifted inwardly or outwardly and selectively engaged or disengaged from the fixed mold or tool holder 2b. To facilitate this, releasable coupling means are defined between the plasticizer and injector assembly 3 and the fixed mold and tool holder 2b which are in the form of catch element 7 mounted on the fixed mold and tool holder 2b in automatically engageable or disengageable with the piston rods 4b for the purpose of connecting or disconnecting the assembly 3 to the fixed mold and tool holder 3.

The plastic injection molding machine illustrated schematically in FIGS. 1 to 4 possesses, in a manner known in itself, a mold-closing and closing force generating unit 1 with toggle lever mechanism 1a, a tool holding device 2 with a movable tool holder 2a and a fixed tool holder 2b, and a plasticizing and injection assembly or group 3, which, by means of a press-on and shift means 4 formed by hydraulic piston device arranged symmetrically to the injection axis a of the machine in a cylinder 4, moved in connect engagement with the injection side tool holder 2b. The cylinders 4a, 4a are carried by the assembly 3 and the pistons are movable for displacement relative to the tool holders.

The control unit provided for the control of all operating processes of the machine is marked 5.

In the example shown, the cylinders 4a of the piston devices of the press-on and shift means 4 are secured on the plasticizing and displacing group 3 which is guided displaceable along the injection axis a on tracks or spars 6 mounted on a support 20, while the piston rods 4b projecting toward the fixed injection side tool holders 2b are detachably fastened to the fixed holders 2b by means of a catch 7 provided on the holder for each piston rod.

In the position of the elements shown in FIG. 1, which corresponds to the injection phase, or the after-pressing phase, of the work cycle of the machine; the two-part or multi-part tool 8 is closed, and the plasticizing and injecting group 3 is in its forward end position, the injection die 3a of the plasticizing cylinder 3b being pressed with great force against the sprue bush 8a of tool 8 in the injection side tool holder 2b, by means of the piston devices 4. Outflow of liquid plastic between nozzle 3a and sprue bush 8a during these phases is thereby prevented.

During the following dosing phase (FIG. 2), the plasticizing and injection group 3 is pushed back a short distance, e.g. a few millimeters, by means of the piston devices 4 with separation of nozzle 3a and sprue bush 8a, to prevent heat transfer between tool 8 and plasticizing and injection group 3 during this phase.

During these recurring successive work phases of the machine, the catches 7 between the piston rods 4b and the injection side tool holder 2b remain continuously engaged.

To be able to perform maintenance work e.g. on the injection nozzle 3a during standstill of the machine, the plasticizing and injection group 3 is moved on the spars 6 into a rear end position (FIG. 3) by complete extension of the piston rods 4b of the press-on and shift means 4. Thereafter the catches 7 are disengaged, and the piston rods 4b, thereby separated from the tool holder 2b, are retracted to their inner end position shown in respect to the lower piston device in FIG. 3. The plasticizing and injection group 3 is pivotably mounted on its support 1 and guided on the spars 6. At an end position it can now, as shown in FIG. 4, be pivoted so that good accessibility of the group parts from the service side of the machine, in particular of the nozzle 3a, is ensured. After completed maintenance work, the plasticizing and injection group 3 is pivoted back into its operating position determined by the injection axis a, whereupon the piston rods 4b are again advanced into the region of the catches 7 toward the tool holder 2b and the catches 7 are engaged. After engagement of the clutches 7, the plasticizing and injecting group can be advanced again into its starting position for the next work cycles, corresponding to the dosing phase (FIG. 2), by means of the piston devices 4a, 4b.

As mentioned before, according to the invention, the engaging and disengaging of the catches 7 is to occur automatically, the actuating elements required for this being controlled by the central control unit 5. A first example of a catches 7 is illustrated in FIG. 5. On the side away from tool 8, on tool holder 2b, a catch housing 10, here shown as multipart, is secured. This catch housing 10 has a bore 11 11 coaxial with the piston rod 4b of the piston device associated with this clutch, the aperture portion of said bore being widened conically and its bottom portion being constructed conically. Two guide channels 12 diametrically opposite each other, in each of which a latching slide 13 is guided, discharge into the central portion of this bore 11. In the engaged position of the catch shown in FIG. 5, the two slides 13 project partially into the bore 11 and define by the bottom of bore 11 the seating space for a coupling head 15, here designed as a ball, at the free end of the piston rod 4b. Each of the latching slides 13 is connected via a piston rod 14a with a piston 14c disposed in a cylinder bore 14b and they can thus be retracted hydraulically or pneumatically from the engaged position of the catch shown in FIG. 5. In the FIG. 5 position they prevent the coupling head 15 at the piston rod 2b from coming out of bore 11, into disengaged position. In this disengaged position of the latching slides, the piston rod 2 with the coupling head 15 can readily be retracted as described in connection with FIG. 3. In the engaged position, shown in FIG. 5, the latching slides 13 block the coupling head 15 in the housing 10. In this engaged position the individual catches 7 establish the solid connection that is necessary in the operation of the machine and that permits transmitting compressive and tensile forces, between the press-on and shift means 4 and the injection side tool holder 2b. As has been mentioned in connection with FIG. 1 to 4, the control of the piston devices 4a, 4b occurs automatically via the programmable control unit 5 of the machine.

Obviously, instead of a spherical coupling head 15 there may be provided at the piston rod 14b coupling head designed differently, e.g. in cylinder or plate form, engaged from behind by the slides 13 in engaged position.

Instead of two latching slides diametrically opposite each other, as shown in FIG. 5, there may be provided a single latching slide 25 movable over a corresponding piston device 24a, 24b, and 24c into and out of engagement position, as is illustrated in FIG. 6 and 7. Here, in the engaged position of the coupling, a cylindrical coupling head at the free end of the piston rod 4b is retained in the housing bore 21 by the latching slide 23. engageable and disengageable coupling between the press-on and shift means and the injection side tool holder is illustrated in FIG. 8. The coupling head 35, moved into a corresponding bore of the catch housing 30, at the free end of the piston rod 4b can here be blocked by means of a latching blade 33 pivotable into and out of engaging position by a corresponding piston device 34a, 35b, 34c.

As has been mentioned before, it is understood that the connecting element of the press-on and shift means 4, referred to above as a piston rod which can be pushed forward and retracted and can be coupled with the tool holder 2b or with the plasticizing and injecting group 3, may alternatively be designed as a motor driven threaded spindle. What is essential is only that this connected element, which brings about the pressing of the nozzle against the injection bush or respectively the separating of the injection side tool holder and the plasticizing and injection group, is connected with the tool holder or respectively with the group by an automatically operable coupling.

As shown in the described examples, appropriately always a positive engagement coupling is provided; however, non-positive couplings would be conceivable also. Complicated and time consuming manual work to establish and to undo the solid connection of the press-on and shift means with the plasticizing and injection group or respectively with the injection side tool holder, as needed in the operation of the machine, is obviated. Couplings of the kind needed are simple in design and actuation. It is then readily possible to engage and disengage all couplings by means of a single actuating device, which device could operate not only hydraulically or pneumatically but also electrically or electromechanically.

While specific embodiments of the invention have been shown and described in detail to illustrate the application of the principles of the invention, it will be understood that the invention may be embodied otherwise without departing from such principles.

What is claimed is:

1. A plastic injection molding machine comprising a support, a tool holder comprising a fixed mold part mounted on said support and a movable mold part, a mold closing and biasing assembly mounted on said support adjacent one side of said fixed mold part and including means connected to the movable mold part to move the movable mold part towards and away from the one side of said fixed mold part, a guide spar mounted on said support extending linearly away from the side of said fixed mold part opposite to said mold closing and biasing assembly, a plasticizer and injector assembly, means mounting said plasticizer and injector assembly for linear movement along said guide spar in alignment with said fixed mold part and for rotational movement out of alignment with the fixed mold part, moving means mounted on one of said platicizer and injector assembly and said fixed mold part and, releasable coupling means defined between said moving means and the other of said plasticizer and injector assembly and said fixed mold part, the releasable coupling means being operable to couple together said plasticizer and injector assembly and said fixed mold part thereby to enable the moving means to move the plasticizer and injector assembly linearly along the spar towards and away from said opposite side of said fixed mold part, release of the coupling means from the other of said plasticizer and injector assembly and said fixed mold part uncoupling the moving means to releasing the plasticizer and injector assembly from the fixed mold part permitting rotational movement of the plasticizer and injector assembly out of alignment with, and away from, the fixed mold part.

2. A plastic injection molding machine according to claim 1 (1), including a control mounted on said support and connected to said parts and the coupling means for automatically controlling the operation thereof.

3. A plastic injection molding machine according to claim 1, wherein said moving means includes a cylinder arranged at each side of said plasticizer and injector assembly and the coupling means includes a catch arranged on corresponding sides of said fixed mold part in alignment with said cylinder, a piston with a piston rod movable in said cylinder and the coupling means including an end portion of the piston rod which is engageable in said catch, said catch having a housing with an opening into which the piston rod end portion is engageable and the catch comprising means for locking said piston rod end portion in said opening in engagement with said housing.

4. A plastic injection machine according to claim 1, wherein said releasable coupling (clutch) means includes a connecting part carried by said plasticizer and injector assembly, and a catch (clutch) carried on said fixed mold part and tool holder into which said connecting part is engaged.

5. A plastic injection molding machine according to claim 4, wherein said moving means comprises a cylinder carried by said plasticizer and injector assembly having a piston therein with a rod extending outwardly therefrom and the connecting part comprises a portion of the rod which engages into said catch, said catch including a housing having an opening therein through which said piston rod portion extends and a member carried by said housing movable to engage and hold said piston rod portion.

6. A plastic injection molding machine according to claim 5, wherein said piston rod portion includes a ball-shaped end, said catch (clutch) having a housing with a bore with an enlarged recess into which the ball-shaped end is fitted and including a slide member carried by said catch housing (clutch) movable(el) to lock behind said ball-shaped end (bore) to hold said piston rod in engagement with said housing (clutch).

7. A plastic injection molding machine according to claim 5, wherein said catch includes a bore into which said piston rod portion extends, said piston rod portion having an enlarged end and said catch including a slide member mounted for movement across said bore to engage said piston rod portion behind the enlarged end and hold it in place.

* * * * *